(12) United States Patent
Koch et al.

(10) Patent No.: US 8,776,447 B2
(45) Date of Patent: *Jul. 15, 2014

(54) COMBINATION FLASHING AND DRAINAGE DEVICE

(75) Inventors: David G. Koch, Mableton, GA (US);
Joseph G. Lincourt, Sanford, ME (US);
Kevin D. Broad, Sanford, ME (US);
Craig Wetmore, Cumberland, ME (US)

(73) Assignee: York Manufacturing, Inc., Sanford, ME (US)

(*) Notice: Subject to any disclaimer, the term of this patent is extended or adjusted under 35 U.S.C. 154(b) by 110 days.

This patent is subject to a terminal disclaimer.

(21) Appl. No.: 13/483,187

(22) Filed: May 30, 2012

(65) Prior Publication Data
US 2012/0233947 A1   Sep. 20, 2012

Related U.S. Application Data

(63) Continuation-in-part of application No. 13/022,492, filed on Feb. 7, 2011, now Pat. No. 8,201,361, which is a continuation of application No. 10/710,845, filed on Aug. 6, 2004, now Pat. No. 7,900,404.

(51) Int. Cl.
    *E04D 3/38*        (2006.01)
(52) U.S. Cl.
    USPC ............. 52/62; 52/169.5; 52/302.6; 52/379
(58) Field of Classification Search
    CPC .......... E04B 1/64; E04B 1/70; E04B 1/7061; B32B 5/024
    USPC ............. 52/58, 60–62, 169.5, 169.14, 305.4, 52/602.6, 232, 513; 442/239; 49/13
    See application file for complete search history.

(56) References Cited

U.S. PATENT DOCUMENTS

| | | | |
|---|---|---|---|
| 3,483,664 A | 12/1969 | Funk et al. | |
| 3,497,417 A | 2/1970 | Rizzo | |
| 3,498,015 A * | 3/1970 | Green et al. | 52/310 |
| 3,946,762 A * | 3/1976 | Green | 405/45 |
| 4,572,700 A * | 2/1986 | Mantarro et al. | 404/35 |
| 6,023,892 A * | 2/2000 | Sourlis | 52/169.5 |
| 6,594,965 B2 | 7/2003 | Coulton | |
| 6,696,141 B2 | 2/2004 | Lolley et al. | |
| 6,964,136 B2 * | 11/2005 | Collins et al. | 52/209 |
| 2002/0152693 A1 | 10/2002 | Krogstad | |
| 2002/0152696 A1 * | 10/2002 | Ruiz et al. | 52/169.5 |
| 2005/0260367 A1 * | 11/2005 | Chambers et al. | 428/34.2 |

OTHER PUBLICATIONS

Benjamin Obdyke Website, HomeSlicker Plus Product Information, http://www.benjaminobdyke.com/visitor/product/key/homeSlickerPlus (visited Apr. 4, 2012).

* cited by examiner

*Primary Examiner* — William Gilbert
(74) *Attorney, Agent, or Firm* — Mesmer & Deleault, PLLC

(57) ABSTRACT

A combination through-wall masonry flashing and drainage device has a flashing membrane of stainless steel, galvanized steel, aluminum, zinc, woven polypropylene, spunbond polypropylene, spunbond polyolefin, bituminous flashing membrane, polymer-modified bituminous flashing membrane, bituminous flashing membrane modified with styrene butadiene styrene, ethylene propylene diene monomer rubber, polystyrene, polyisocyanurate, or ketone ethylene ester resin. A wicking cloth is adhered to the flashing membrane, whereby when installed between an inner wall and outer wall with the wicking cloth facing up, water between the inner wall and outer wall is drawn through a mortar joint at the base of the outer wall to the outside of the outer wall by the wicking action of the wicking cloth without the need for vents.

6 Claims, 3 Drawing Sheets

COMBINATION FLASHING AND DRAINAGE DEVICE

This application is a continuation-in-part of U.S. non-provisional application Ser. No. 13/022,492, filed on Feb. 7, 2011, which is a continuation of U.S. application Ser. No. 10/710,845, filed Aug. 6, 2004 (now U.S. Pat. No. 7,900,404).

BACKGROUND

1. Field of the Invention

The invention is related to multi-layer flashing devices and systems for masonry.

2. Description of the Related Art

Traditionally, a masonry cavity wall is constructed having an inner back-up wall made of concrete, masonry block, brick, wood or steel frame construction, and an outer veneer wall of brick, stone, block, stucco, or other masonry. The two walls are separated by an air space or cavity. The width of this cavity can be specified by building code or architectural design preference. The purpose of this type of design, two walls separated by a cavity, is to prevent water from reaching the interior of the building as well as for its insulation value. As water penetrates the outer wall or "wythe", it collects and condenses on the inner face of the outer wall. It runs down this surface to a point where its downward flow is interrupted by a horizontal plane such as a window, door, shelf angle, lintel, or the base of the wall itself. At these points, the water is diverted out of the wall by the through-wall flashing and weep devices which are placed in such a manner as to maximize the evacuation of the water. Weep devices can be metal or plastic tubes, ropes, and other devices.

Ideally, the flashing is affixed to the back-up wall by any of several methods. One method is to insert the flashing into a horizontal joint, if the back-up wall is a masonry block wall. Another method is to insert the flashing into a reglet, which is a horizontal slot placed in a poured concrete back-up wall. Yet another method is to mechanically fasten the flashing to the backup wall with screws and a termination bar. A termination bar is a strip of metal or plastic with evenly spaced holes for screws designed to spread the load evenly across the width of the bar. This may be used on any kind of back-up wall.

The flashing runs down the face of the back-up wall to a horizontal ledge or shelf. Then it turns and runs horizontally out and through the brick veneer, forming a continuous sheet that guides any water out of the wall and prevents any water from reaching the interior of the building. This flashing was traditionally made of heavy gauge copper or lead sheet that required trained metal workers to install correctly. Laps and seams needed to be soldered, which is difficult to do properly and in a watertight fashion.

One solution to this problem is disclosed in U.S. Pat. No. 2,005,221, which is not admitted to being prior art by its inclusion in this Background section. In that patent, a copper flashing is provided with a waterproofed fabric adhered to it. However, it cannot wick water away because it is waterproof by definition.

Another problem that appears in through-wall flashing/cavity wall construction is that, as the wall is built, excess mortar from subsequent layers of brick falls into the cavity and blocks the weep openings or ropes, which can render these very important components of this system inoperable. One solution to this problem was disclosed in U.S. Pat. No. 6,023,892, which is not admitted to being prior art by its inclusion in this Background section. The solution to place something in the cavity that would allow water to migrate through to the weeps, yet prevent mortar and debris from clogging these openings. Other solutions, like using peastone gravel or a plastic mesh unit, are still in use today.

These cavity filling devices, both gravel and plastic, have deficiencies. The gravel is heavy and difficult to transfer to higher levels of scaffolding, which leads to it being omitted. There are also claims that, because of its density in the cavity, it allows the mortar to fill up the cavity, thereby defeating the purpose. The plastic mesh products, commonly marketed under the MORTAR NET and MORTAR BREAK trademarks, are quite expensive, often costing more than the flashing itself.

This has led to the need for a product that eliminates the need for other products, is easy to install, and performs as well or better as other products which, when combined, serve the same purpose, that of allowing the free flow of water from a masonry wall cavity.

SUMMARY

The new product combines the durability, flexibility, and ease of installation of traditional copper fabric flashing, with an attractive drainage method, namely a thin, virtually invisible and effective mortar blockage prevention device. All of this is provided in a single, easy to install, relatively inexpensive product.

In one embodiment, a combination through-wall masonry flashing and drainage device has a flashing membrane of stainless steel, galvanized steel, aluminum, zinc, woven polypropylene, spunbond polypropylene, spunbond polyolefin, bituminous flashing membrane, polymer-modified bituminous flashing membrane, bituminous flashing membrane modified with styrene butadiene styrene, ethylene propylene diene monomer rubber, polystyrene, polyisocyanurate, or ketone ethylene ester resin. A wicking cloth is adhered to the flashing membrane second side, whereby when installed between an inner wall and outer wall with the wicking cloth facing up, water between the inner wall and outer wall is drawn through a mortar joint at the base of the outer wall to the outside of the outer wall by the wicking action of the wicking cloth without the need for vents.

In another embodiment of the present invention, the wicking cloth is a synthetic material.

In another embodiment of the present invention, the wicking cloth has a thickness of about 0.050 inches.

In another embodiment of the present invention, the wicking cloth has a weight between five and seven ounces per square yard.

In another embodiment of the present invention, the wicking cloth is polyester, polypropylene, polypropylene nylon, or polyethylene.

In another embodiment of the present invention, the wicking cloth transports liquid by at least one of capillary action, fiber tow infiltration, and gravity.

In another embodiment of the present invention, the device also has an adhesive disposed between the wicking cloth and the flashing membrane.

DETAILED DESCRIPTION

Figure 1:
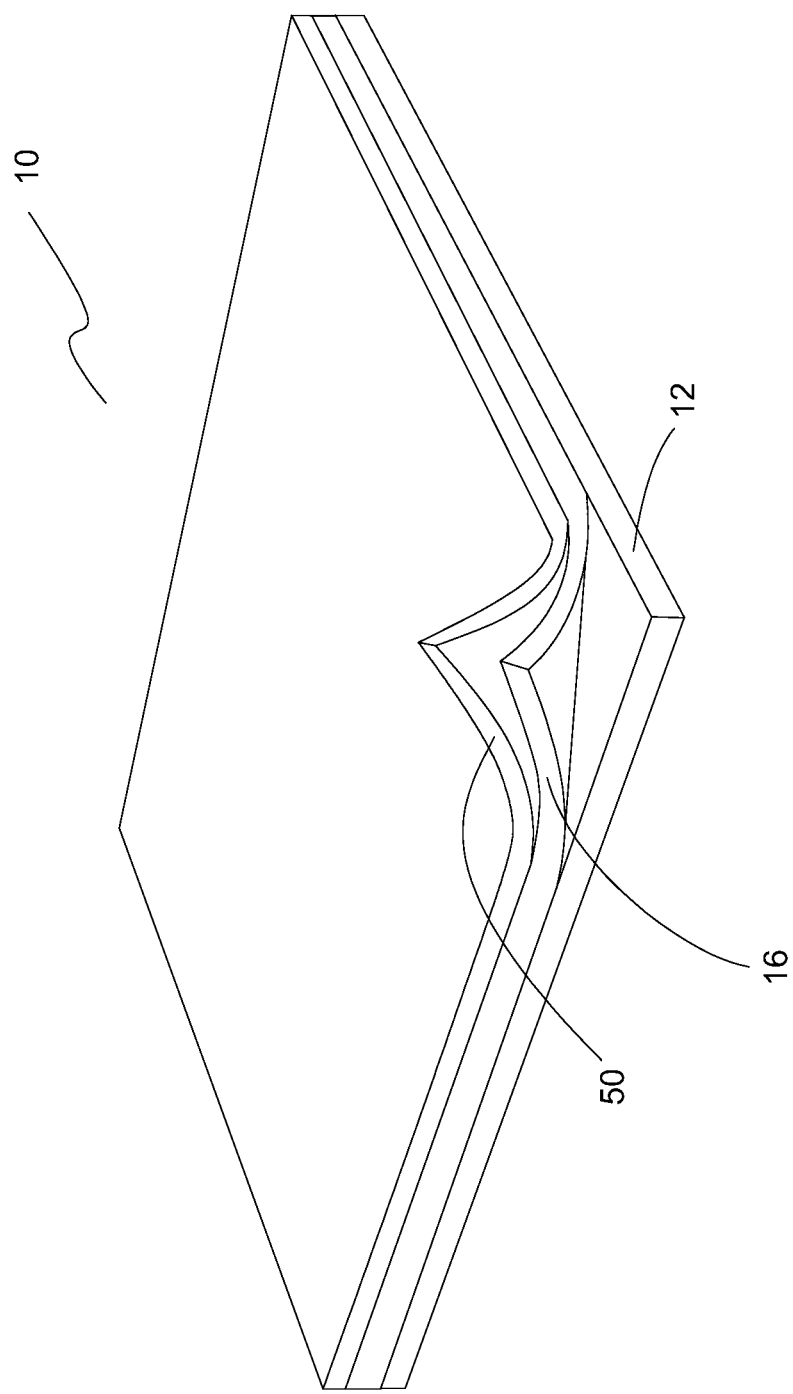
FIG. 1 shows the components of one embodiment of a combination flashing and drainage device of the present invention.

FIG. 1 shows one embodiment of a combination through-wall masonry flashing and drainage device 10 that includes a flashing membrane 12 and a wicking cloth 50 adhered to the flashing membrane 12. An optional adhesive 16 is disposed between flashing membrane 12 and wicking cloth 50. For clarity in showing the components of combination flashing and drainage device 10, the corners of adhesive 16 and wicking cloth 50 are shown curled up from flashing membrane 12. Wicking cloth 50 is preferably the top layer of device 10 shown in FIG. 1.

Figure 2:
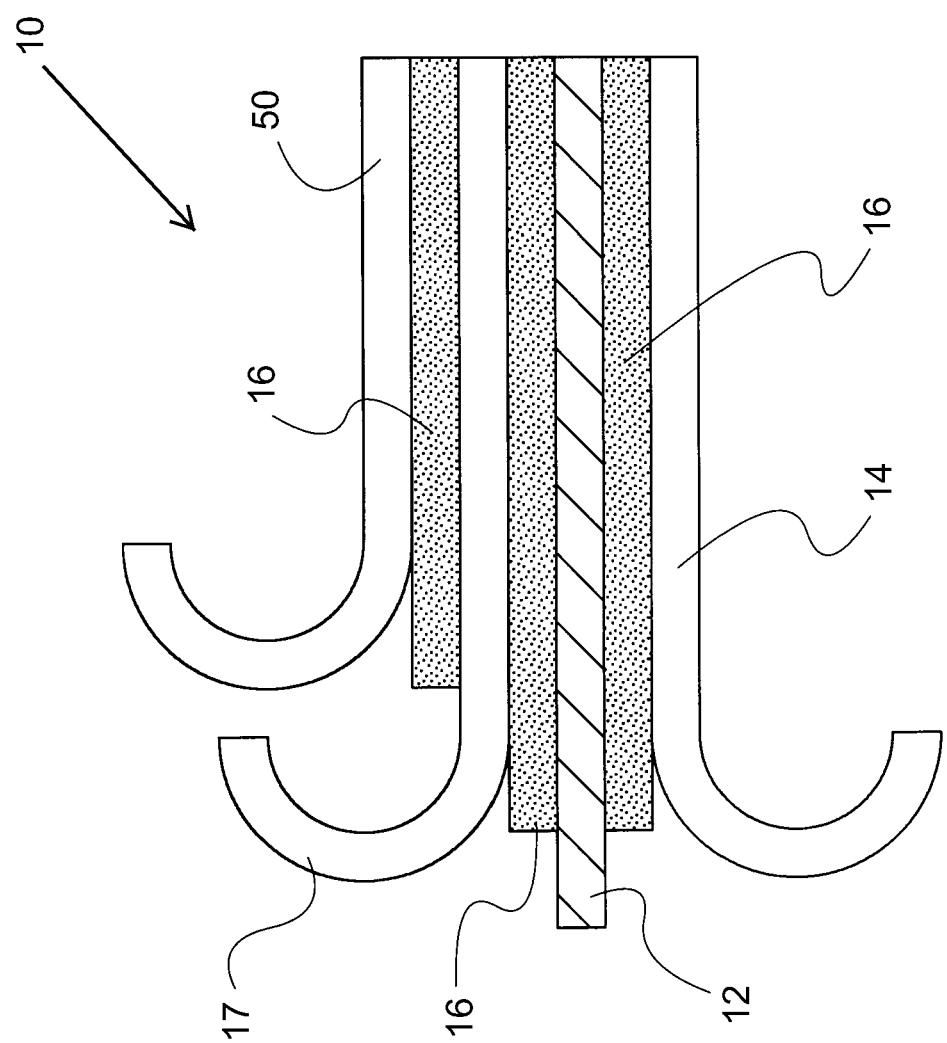
FIG. 2 shows the components of another embodiment of a flashing and drainage device according of the present invention.
Figure 3:
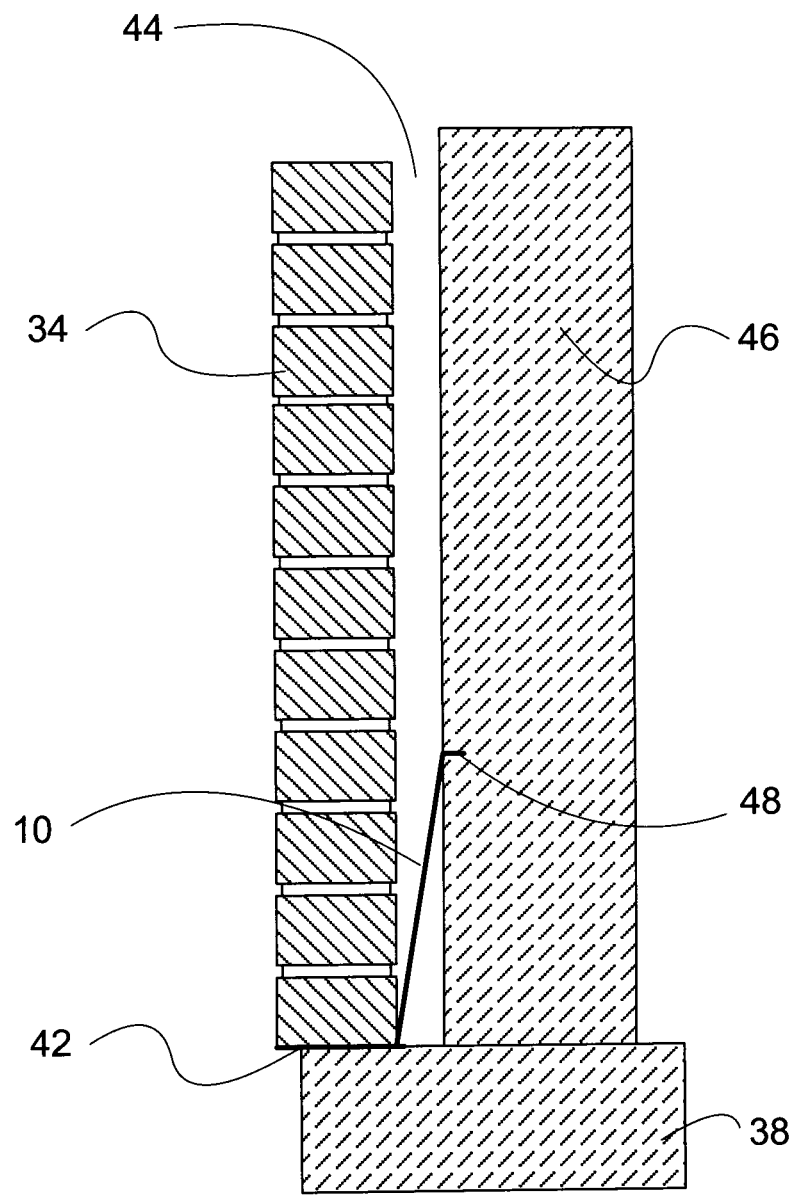
FIG. 3 is a side cut-away view of a masonry wall showing how the invention is used.

FIG. 2 shows an alternate embodiment of a combination through-wall masonry flashing/drainage device 10 that includes a flashing membrane 12, a first reinforcing cloth 14 adhered to a first side of flashing membrane 12 with an adhesive 16. A second reinforcing cloth 17 is adhered to a second side of flashing membrane 12 with adhesive 16. A wicking cloth 50 is adhered to second reinforcing cloth 17 with adhesive 16. For the purpose of clarity in showing the components of combination flashing and drainage device 10, reinforcing cloths 14, 17 and wicking cloth 50 are shown in FIG. 1 as curling away from flashing membrane 12. Flashing membrane 12 is preferably at the core of device 10 shown in FIG. 2.

Examples of suitable flashing membrane materials include, without limitation, metal, polymers, paper, and bituminous materials. Metal materials for flashing membrane 12 include copper, stainless steel, galvanized steel, aluminum, zinc, alloys of these metals, and other metals. If copper is used for the flashing membrane, the copper preferably conforms to ASTM B-370-98 (incorporated herein by reference), weighs 3 to 7 ounces/square foot, and is between 0.0036 inches and 0.0094 inches thick.

Polymer-based membranes 12 include a variety of plastic, rubber, resins, and the like. One embodiment has a membrane made of spunbond polypropylene, which is a non-woven fabric made of thermally-bonded, continuous polypropylene filaments. In another embodiment, flashing membrane 12 is a polyolefin membrane. One example is a peel-and-stick polyolefin substrate such as the GenFlex-TPO Peel & Stick® curb flashing. GenFlex-TPO is a thermoplastic polyolefin membrane with a thickness of about 0.040-0.060" and reinforced with polyester or fiberglass scrim. The product is made according to ASTM D 6878-03, incorporated herein by reference. Polyolefin membrane materials also include non-woven spunbond polyolefin fiber membranes such as DuPont's Tyvek® non-woven HomeWrap®. Other suitable membrane materials include polyvinyl chloride (PVC), ketone ethylene ester resin (e.g., DuPont's Elvaloy® KEE), polystyrene (e.g., Dow Styrofoam™), polyisocyanurate and glass-fiber reinforced polysiocyanurate (e.g., Dow Thermax® insulation board), polyethylene, woven polypropylene, spunbond polypropylene, and ethylene propylene diene monomer rubber (EPDM) (e.g., Firestone FlashGard™ Thru-Wall flashing).

Flashing membrane 12 may also be made of paper-based materials. Examples of paper membranes include kraft paper, red rosin paper, natural rosin paper, or fiberglass-reinforced multi-ply kraft paper such as Seekure® by Fortifiber Corp.

Bituminous membrane materials include asphalt-impregnated paper, asphalt saturated kraft paper, tar paper shingle underlayment, and polymer-modified bituminous materials. The #15 and #30 multi-purpose felt made by American Saturated Felt, Inc. are examples of suitable bituminous flashing membranes.

Polymer-modified bituminous sheet materials include those where styrene butadiene styrene (SBS) thermoplastic elastomer is the primary modifier. The polymer-modified bituminous sheet may be granule surfaced sheet or a smooth-surfaced prefabricated bituminous sheet. The sheet is preferably reinforced with polyester fabric modified by styrene butadiene styrene (SBS) thermoplastic elastomer. Specifications for these materials are described in ASTM D 6164-00 and D 6164-11, both of which are incorporated herein by reference.

An optional first reinforcing cloth 14 is adhered to a first side of the flashing membrane 12 using an adhesive 16. Reinforcing cloth 14 is preferably used when flashing membrane 12 is a copper fabric flashing membrane. The reinforcing cloth 14 is preferably made of fiberglass and can be woven or non-woven, but preferably weighs between 0.2 and 0.3 ounces/square foot. Other natural or synthetic fabrics could also be used instead of fiberglass.

Adhesive 16 is preferably a hot-melt type of adhesive, and is either rubber or latex.

Optionally, a second reinforcing cloth 17 may be provided and adhered to a second side of the flashing membrane 12 with a layer of adhesive 16. The second reinforcing cloth 17 may be the same material as the first reinforcing cloth 14. The purpose of reinforcing cloths 14, 17 is to reinforce and protect the flashing membrane during installation, and also to provide a rough textured surface that promotes bonding in the mortar joint.

A wicking cloth 50 is provided and adhered to the second side of the flashing membrane 12 with an adhesive 16. In the embodiment shown in FIG. 1, wicking cloth is adhered to the top surface of flashing membrane 12. If a second reinforcing cloth 17 is used, then the wicking cloth 50 is adhered to the outside of the second reinforcing cloth 17 as shown in FIG. 2. Otherwise, the wicking cloth is adhered directly to the flashing membrane 12 with a layer of adhesive 16. The wicking cloth 50 is made of either polyester, polypropylene, polypropylene nylon, or polyethylene. The material is preferably 0.050 inches thick, and weighs between five and seven ounces/square yard. The wicking cloth 50 can be either woven or non-woven. A synthetic fiber material is preferred for long life, mildew resistance, and strength. The primary criterion is that the cloth has suitable wicking characteristics.

Materials and devices used previously do not have wicking material that runs the length of the front joint of an outside wall as the present invention does. The previous materials and devices relied only on gravity to transport water from between an inside and outside wall through weep vents in the outside wall. The present invention uses wicking in addition to gravity to transport water through the mortar joint without a weep vent. To emphasize the technical difference between the two liquid transport methods, wicking is the absorption of liquid into a material by capillary action. Wicking is also known as fiber tow infiltration.

This product would preferably be manufactured as a continuous web on a double-sided, extrusion slot-die, coater/laminator. The flashing membrane base material 12 is fed into the machine where it passes over the first of two slot die extruders. The adhesive 16 is extruded in a continuous sheet/film and applied through contact to one side of the membrane. The first reinforcing cloth 14 is immediately introduced and pressed into the adhesive 16 by a series of rollers. The now three-layer product continues through the machine to such a point as the opposite side passes over the second slot die.

Adhesive 16 is extruded and the second cloth, either reinforcing or wicking, and is applied in the same manner as the first, but to the opposite side of the flashing membrane 12. If a third layer of cloth 50 is to be applied, i.e. two layers of reinforcing, one layer of wicking, the web would have to be passed through the machine a second time.

As an alternative, the product could also be made as a self-adhesive product, combining a self-adhesive roofing underlayment style membrane with the wicking fabric on the outer surface. This roofing underlayment would be best described in ASTM standards D 6164-00 and D 1970-01 with the "top surface" being the wicking fabric. ASTM D6164-00 and D1970-01 are incorporated herein by reference.

FIG. 2 shows an example of how the device 10 can be used. A two-inch cavity structure 44 has an upstanding front brick wall 34 and a back concrete wall 46 supported on a horizontal concrete support 38, wherein about a two inch cavity is between the front and back walls. The through-wall masonry flashing/drainage device 10 is shown as secured in a reglet 48 of the back concrete wall 46 bonded mechanically within the reglet 48. The flashing material extends downwardly within the two inch cavity 44 and exits at the front mortar joint 42, permitting trapped water to be released to the outside of the structure without the need for vents.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A through-wall masonry flashing and drainage device comprising:
    a flashing membrane, the flashing membrane having a first side and a second side opposite the first side, the flashing membrane selected from the group consisting of stainless steel, galvanized steel, aluminum, zinc, woven polypropylene, spunbond polypropylene, spunbond polyolefin, bituminous flashing membrane, polymer-modified bituminous flashing membrane, bituminous flashing membrane modified with styrene butadiene styrene, ethylene propylene diene monomer rubber, polystyrene, polyisocyanurate, and ketone ethylene ester resin; and
    a wicking cloth adhered with an adhesive directly to the flashing membrane second side, thereby forming an integral through-wall masonry flashing and drainage device that provides a pathway for moisture to move from a cavity between an inner wall and an outer wall of a structure;
    wherein when installed between the inner wall and the outer wall with the wicking cloth facing up, moisture between the inner wall and the outer wall is drawn through a mortar joint at a base of the outer wall to the outside of the outer wall by wicking action of the wicking cloth without the need for vents.

2. The device of claim 1, wherein the wicking cloth is a synthetic material.

3. The device of claim 2, wherein the wicking cloth is selected from the group consisting of polyester, polypropylene, polypropylene nylon, and polyethylene.

4. The device of claim 1, wherein the wicking cloth has a thickness of about 0.050 inches.

5. The device of claim 1, wherein the wicking cloth has a weight between five and seven ounces per square yard.

6. The device of claim 1, wherein the wicking cloth transports liquid by at least one of capillary action and fiber tow infiltration.

* * * * *